US011328346B2

(12) United States Patent
Ramos et al.

(10) Patent No.: US 11,328,346 B2
(45) Date of Patent: May 10, 2022

(54) METHOD, SYSTEM, AND COMPUTER PROGRAM PRODUCT FOR PRODUCT IDENTIFICATION USING SENSORY INPUT

(71) Applicant: International Business Machines Corporation, Armonk, NY (US)

(72) Inventors: Igor S. Ramos, Round Rock, TX (US); Kimberly J. Taft, Austin, TX (US); Devon E. Mensching, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/450,718

(22) Filed: Jun. 24, 2019

(65) Prior Publication Data

US 2020/0402146 A1 Dec. 24, 2020

(51) Int. Cl.
*G06Q 30/06* (2012.01)
*G06K 7/10* (2006.01)
*G06F 16/58* (2019.01)

(52) U.S. Cl.
CPC ......... *G06Q 30/0643* (2013.01); *G06F 16/58* (2019.01); *G06K 7/10554* (2013.01); *G06Q 30/0609* (2013.01); *G06Q 30/0623* (2013.01); *G06Q 30/0631* (2013.01)

(58) Field of Classification Search
CPC ............. G06Q 30/0601–0645; G06Q 30/0623
USPC ................................................ 705/26.1–27.2
See application file for complete search history.

(56) References Cited

U.S. PATENT DOCUMENTS

| 6,411,905 | B1 | 6/2002 | Guoliang |
| 8,930,341 | B2 | 1/2015 | Amin |
| 9,165,320 | B1* | 10/2015 | Belvin ............... G06Q 30/0633 |
| 9,852,441 | B2 | 12/2017 | Ford |
| 9,922,525 | B2 | 3/2018 | Hummer |
| 10,497,465 | B2 | 12/2019 | Huber |
| 2002/0174035 | A1* | 11/2002 | Stern ................. G06Q 30/0601 705/26.1 |
| 2010/0262449 | A1 | 10/2010 | Monteforte |

(Continued)

FOREIGN PATENT DOCUMENTS

| CN | 102590288 B | 9/2013 |
| JP | 0510904 A | 1/1993 |

OTHER PUBLICATIONS

Lardinois, Frederic. "Houzz now uses deep learning to help you find and buy products in its photos". (2016) TechCrunch. (Year: 2016).*

(Continued)

*Primary Examiner* — Allison G Wood
*Assistant Examiner* — Katherine A Barlow
(74) *Attorney, Agent, or Firm* — Richard B. Thomas (57) ABSTRACT

A first type of data regarding an unidentified product is collected. A first type of analysis on the first type of data is performed. A second type of data regarding an unidentified product is collected. A second type of analysis on the second type of data is performed. Based upon the first type of analysis on the first type of data and the second type of analysis on the second type of data, product identification for the unidentified product is performed. Based on the product identification, an identity of the unidentified product is output. A user is enabled to perform a business interaction with a product matching the identity of the unidentified product.

14 Claims, 4 Drawing Sheets

(56) References Cited

U.S. PATENT DOCUMENTS

| | | | | |
|---|---|---|---|---|
| 2010/0332571 | A1* | 12/2010 | Healey | G16H 20/60 |
| | | | | 707/759 |
| 2011/0106656 | A1* | 5/2011 | Schieffelin | G06Q 30/0603 |
| | | | | 705/26.9 |
| 2011/0276430 | A1* | 11/2011 | Vyas | G06Q 30/0633 |
| | | | | 705/26.8 |
| 2013/0065640 | A1 | 3/2013 | Song | |
| 2013/0132308 | A1 | 5/2013 | Boss | |
| 2013/0309637 | A1 | 11/2013 | Eugenio | |
| 2014/0052555 | A1 | 2/2014 | Macintosh | |
| 2015/0228062 | A1 | 8/2015 | Joshi | |
| 2016/0034809 | A1 | 2/2016 | Trenholm | |
| 2016/0370340 | A1 | 12/2016 | Blackley | |
| 2017/0069010 | A1 | 3/2017 | Amin | |
| 2017/0369168 | A1 | 12/2017 | Hwang | |
| 2017/0372127 | A1* | 12/2017 | Meany | G06F 16/5838 |
| 2018/0032991 | A1* | 2/2018 | Scanlin | G06Q 30/0633 |
| 2018/0345485 | A1* | 12/2018 | Sinnet | G06K 9/00771 |
| 2019/0149725 | A1* | 5/2019 | Adato | H04N 1/32144 |
| | | | | 348/158 |
| 2019/0188435 | A1* | 6/2019 | Davis | G06K 9/3258 |
| 2019/0209022 | A1 | 7/2019 | Sobol | |
| 2019/0236678 | A1* | 8/2019 | Wilkinson | G01N 33/02 |
| 2019/0317079 | A1 | 10/2019 | Trenholm | |
| 2020/0183925 | A1 | 6/2020 | Amin | |

OTHER PUBLICATIONS

Baker, Natalie. "New apps help shoppers identify items using image recognition" Aug. 26, 2013. Reuters.com (Year: 2013).*

Brattoli, Magda et. al. "Odour Detection Methods: Olfactometry and Chemical Sensors" May 16, 2011. Sensors MDPI (Year: 2011).*

Imperial College London "Food freshness sensors could replace 'use-by' dates to cut food waste" Jun. 5, 2019. ScienceDaily.com (Year: 2019).*

Hsu, Jeremy. "Smartphones Could Form Chemical Detection Networks" LiveScience.com (Year: 2009).*

Howell, Elizabeth. "Curiosity Rover on Mars: Facts and Information" Space.com (Year: 2018).*

Hackett, Jay et. al. "Three-dimensional object recognition using multiple sensors." Sensor Fusion III: 3D Perception and Recognition . Proceedings vol. 1383. https://doi.org/10.1117/12.25301 (Year: 1991).*

"Nose," ENT Health, printed Apr. 2, 2019, 7 pages. <https://www.entnet.org//content/smelltaste>.

Adak et al., "Classification of E-Nose Aroma Data of Four Fruit Types by ABC-Based Neural Network," Sensors, 16 (3), 304, Feb. 27, 2016, doi:10.3390/s16030304, 13 pages.

Banerjee et al., "Fusion of Electronic Nose and Tongue Response Using Fuzzy based Approach for Black Tea Classification," Procedia Technology, vol. 10, 2013, pp. 615-622.

List of IBM Patents and Patent Applications Treated as Related, Jun. 21, 2019. 2 pages.

Podrażka et al., "Electronic Tongue—A Tool for All Tastes?" Biosensors, 8(1), 3, Dec. 31, 2017, doi: 10.3390/bios8010003, 24 pages.

Ramos et al., "Product Identification Using Sensory Input," U.S. Appl. No. 16/450,317, filed Jun. 24, 2019.

Sawant, "Electronic Nose," SlideShare, Mar. 6, 2016, 24 pages, <https://www.slideshare.net/monticasawant/electronicnose59153054>.

Schuman, "The game-changing potential of smartphones that can smell," Computerworld, Jun. 6, 2018, 3 pages. <https://www.computerworld.com/article/3278594/mobile-wireless/the-game-changing-potential-of-smartphones-that-can-smell.html.>.

Zakaria et al., "Improved Classification of Orthosiphon Stamineus by Data Fusion of Electronic Nose and Tongue Sensors," Sensors, vol. 10, 2010, doi: 10.3390/s101008782, pp. 8782-8796.

* cited by examiner

METHOD, SYSTEM, AND COMPUTER PROGRAM PRODUCT FOR PRODUCT IDENTIFICATION USING SENSORY INPUT

BACKGROUND

A product's packaging and/or display materials associated with a product can provide information which assists a person in identifying the product. The packaging and/or display materials can include additional information useful to a person. Once a product is outside of and disassociated with its original packaging, it can be challenging to identify what the product is. It can also be challenging for a person to purchase a product they can observe that is disassociated with its original packaging.

SUMMARY

Disclosed herein are embodiments of a method, system, and computer program product for product identification. A first type of data regarding an unidentified product is collected. A first type of analysis on the first type of data is performed. A second type of data regarding an unidentified product is collected. A second type of analysis on the second type of data is performed. Based upon the first type of analysis on the first type of data and the second type of analysis on the second type of data, product identification for the unidentified product is performed. Based on the product identification, an identity of the unidentified product is output. A user is enabled to perform a business interaction with a product matching the identity of the unidentified product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of embodiments of the present disclosure relate generally to product identification, and more specifically, to determining the identity of a product using a device with various sensing capabilities and various analyses of received input regarding a product. While the present disclosure is not necessarily limited to such applications, various aspects of the disclosure can be appreciated through a discussion of various examples using this context.

A product's packaging and/or display materials associated with a product can provide information which assists a person in identifying the product. Many times, a product's packaging will include product identification on it including the name of the product, the name of the manufacturer, and an identifying number such as a UPC (universal product code), SKU (stock keeping unit), model number, or other identification number. The packaging and/or display materials can include additional information useful to a person including a date of manufacture, a location of manufacture, a region of a country where one or more components were obtained or grown, etc. Once a product is outside of and disassociated with its original packaging, it can be challenging to identify what the product is. For example, this can be true for some types of food products such as cheeses or beverages, which may not be distinguishable from similar products to a person without additional information. Even if a person may be able to identify a category or other broader indication of what a product is, such as parmesan cheese, a person may not be able to identify the specific farm, manufacturer, or age of the cheese without product packaging. This can also be true for items such as beverages (e.g., juices, wines, coffees) or liquids once poured out of their original containers. In other situations, a person may wish to identify a vapor, such as a perfume, in order to purchase or obtain more information about what they are smelling, without having access to the original container.

It can also be challenging for a person to purchase a product they can observe that is disassociated with its original packaging. As online shopping grows, it can be difficult for people to discover new products because they may spend less time browsing aisles of grocery stores and shops in shopping malls. Instead, some consumers rely on exposure to new products in their daily lives. However, when a consumer discovers a product they can see, smell, or taste, but cannot identify without assistance, it can be difficult for the consumer to learn more about and possibly purchase that product.

Some embodiments of the present disclosure provide for a method, system, and computer program product for product identification and product purchasing. A device is presented which can use both sensor input and crowdsourcing to identify commercial products. It can be a network-connected device and can be capable of performing visual and chemical substance sampling. It can perform various types of analyses including visual analysis from picture and/or video input, gaseous chemical analysis to determine a scent profile of the chemicals present in the air surrounding the product, contact chemical analysis to identify chemicals present on the surface of the product (and/or probe within the product to determine chemicals present within the product), and use human input. One or more of these types of analyses can be used in a product identification analysis, including fusing analyses from multiple sources. The identified product can be used for various types of business logic, including connecting the user to one or more places (including e.g., physical or website) where the product can be purchased, and/or further details of the product can be obtained or compared with similar products. This process can be improved by collecting user feedback and updating the models for applicable types of analyses as appropriate.

Product identification as described herein using the device and processes described can provide advantages over prior methods of identification of products by enabling automation, reducing inaccurate human guesses of what a product might be, and streamlining business applications for identified products. The use of the teachings presented herein can assist a user who may be unable to identify a product without the aid of technology due to inexperience or physical limitation (e.g., blindness, color blindness, anosmia, etc.). Additionally, the teachings presented herein can enable a user to purchase a product they can observe, but cannot otherwise identify and find a way to purchase. These improvements and/or advantages are a non-exhaustive list of example advantages. Embodiments of the present disclosure exist which can contain none, some, or all of the aforementioned advantages and/or improvements.

Figure 1:
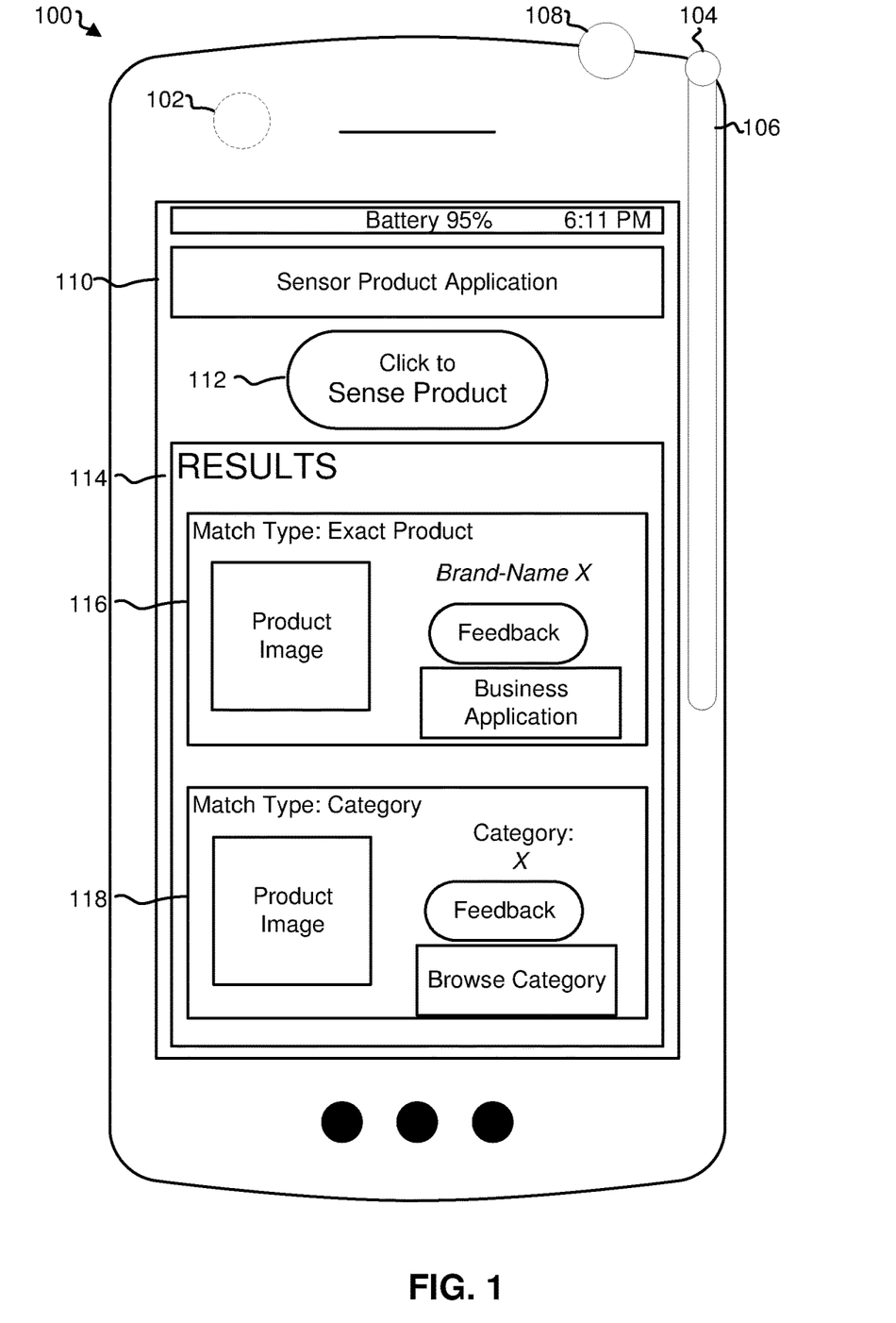
FIG. 1 depicts a diagram of a computing device including a display for product identification, in accordance with embodiments of the present disclosure.

Referring now to FIG. 1, depicted is a diagram of a computing device 100 including a display 110 for product identification, in accordance with embodiments of the present disclosure. FIG. 1 shows a computing device 100, which is depicted in a form similar to many mobile devices such as a cellular phone including e.g., a display 110, speaker bar, and buttons. However, computing device 100 is not limited to a mobile device such as a cellular phone and can take the form of any computing device with the functionality described below, including a tablet, laptop computer, desktop computer, wearable computing device, or other computing device. Computing device 100 can be more or less complicated in embodiments, including additional sensors, components, computers, or the like. Additionally, one or more components may be combined or omitted in some embodiments.

Computing device 100 includes a camera 102, which is depicted in a dotted line to indicate the camera may be positioned on the back of computing device 100 where a user can view the screen of computing device 100 while taking pictures and/or video using camera 102. In other embodiments, camera 102 can be located elsewhere on computing device 100 or can be attached or otherwise connected to computing device 100 (e.g., linked via a cable, connected via Bluetooth, or other means for associating a camera 102 with computing device 100). Camera 102 can be used to take one or more photographs or videos of a product for identification by computing device 100. Camera 102 can be conceptualized as an electronic-eye or e-eye for the computing device 100 to "see" the product to be identified. In this way, computing device 100 can obtain visual information useful for comparing to stock photographs or videos or other photographs or videos which can identify a particular product and/or category of product. Such stock or other photos or video can be contained in a corpus of information or other repository (not depicted) contained within computing device 100 or which the computing device 100 can access, such as over a computer network. In some embodiments, camera 102 can be part of augmented reality glasses or goggles. In some embodiments utilizing augmented reality glasses or goggles, one or more features discussed below with regard to display 110 may be presented to a user via the augmented reality glasses or goggles.

Computing device 100 also contains a gaseous chemical sensor 104. In some embodiments, gaseous chemical sensor 104 may be associated with a sampling probe 106 which can be removed from inside computing device 100 when sampling is required. Gaseous chemical sensor 104 can be used to obtain one or more samples of a product for identification by computing device 100. In embodiments where a gas or vapor (e.g., perfume) is the product to be identified, this can be by placing gaseous chemical sensor 104 and/or sampling probe 106 in a volume containing the product to be identified (e.g., an area of a room where the perfume can be smelled). In other embodiments, gaseous chemical sensor 104 and/or sampling probe 106 can be placed near a product which is giving off gas or vapor which can help identify the product (e.g., above a steaming cup of a beverage to aid in identifying the beverage). Gaseous chemical sensor 104 can be conceptualized as an electronic-nose or e-nose for the computing device 100 to "smell" the product to be identified. In this way, computing device 100 can obtain chemical information useful for comparing to chemical signatures of known products which can identify a particular product and/or category of product based on similarity or match.

Gaseous chemical sensor 104 can employ various machine olfaction techniques to simulate the sensation of smell. Gaseous chemical sensor 104 may use various types of sensor technology and can include a sensor array and a signal transducer. Adsorption of volatile compounds in a gaseous state on the sensor surface can cause a change in the physical properties of the sensor, which can affect the electrical properties of the sensor. The response(s) can be recorded by an electronic interface as digital values. Various types of sensors and/or sensor arrays can be used in embodiments. Such sensors can include conductive-polymer sensors (such as polypyrrole), tin-oxide (or other metal-oxide) gas sensors, and piezoelectric sensors (including quartz-crystal micro-balance) sensors, metal-oxide silicon field effect transistor sensors, and optical sensors. Gaseous chemical sensor 104 may also use various types of chemical differentiation techniques including gas chromatography and/or mass spectroscopy. Gaseous chemical sensor 104 can include one or more sensor components that change color when exposed to a particular gas.

Computing device 100 also contains a contact chemical sensor 108. In some embodiments, contact chemical sensor 108 may be associated with a sampling probe 106 which can be removed from inside computing device 100 when sampling is required. In some embodiments, this may be a separate sampling probe 106 from the sampling probe 106 associated with gaseous chemical sensor 104, while in other embodiments these sensors may share sampling probe 106. Contact chemical sensor 108 can be used to obtain one or more samples of a product for identification by computing device 100. In embodiments where a liquid is the product to be identified, samples can be obtained by placing contact chemical sensor 108 and/or sampling probe 106 in a volume containing the product to be identified (e.g., in a container of liquid where the liquid is the product to be identified). In other embodiments, contact chemical sensor 108 and/or sampling probe 106 can be placed on the surface of or inserted into a product to analyze the chemicals present in the product. Contact chemical sensor 108 can be conceptualized as an electronic-tongue or e-tongue for the computing device 100 to "taste" the product to be identified. In this way, computing device 100 can obtain chemical information useful for comparing to chemical signatures of known products which can identify a particular product and/or category of product based on similarity or match.

Examples of contact chemical sensor 108 can be selected from types such as optical, electrochemical, magnetic, and thermal. Optical chemical sensor can be based on changes in optical phenomena analysis arising from the interaction between the sample and the receiver. Electrochemical sensors can utilize electrochemical effects in a sample and electrodes present in the sensors. A magnetic sensor can be based on the magnetic properties of a sample. A thermal sensor can utilize a thermal effect generated by one or more chemical reactions or adsorption processes. Any other suitable chemical sensors or types of chemical sensors known in the art may be used as contact chemical sensor 108.

Computing device 100 includes display 110. Included in the display 110 of FIG. 1 are non-limiting examples of images and buttons which can be presented to a user for interacting with computing device 100. Display 110 as shown includes a status bar with indications such as battery level and time, a header with the name of the sensor product application in use by computing device 100, a button 112 a user can press to engage in product identification, and a results window 114 where the computing device 100 can display output to the user upon completion of product identification.

In some embodiments, button 112 can be used to perform multiple functions and/or multiple buttons can be present. A user may press the portion of display 110 to activate button 112 to begin product identification when encountering a product they wish to identify. One or more of the methods or processes described below with regard to FIG. 2 or 3 may be initiated by such a button press. A user may also activate button 112 to begin a particular type of sensing, such as to activate a camera 102, gaseous chemical sensor 104, or contact chemical sensor 106.

The results 114 section of display 110 is shown in FIG. 1 to include an exact product match section 116 and a category product match section 118. In some embodiments, only one of these sections may be displayed and in other embodiments, more than one of either or both of exact product match section 116 or category product match section 118 can be displayed. This could occur where the results of product identification yield more than one likely match for the product or category of product. In some embodiments, these may be accompanied by an indicator of confidence, such as a percent likelihood of match based upon the sensing and analyses performed, or a more general indicator such as a star rating (e.g., a 4 star rating out of 5 stars to indicate a good match, but not a perfect match).

Exact product match section 116 can include an image of the product, a name of the exact product, such as a brand name or other name given to the product by a manufacturer or distributor, and one or more ways for a user to interact with the exact product shown in exact product match section 116. As depicted in FIG. 1, there is a button in exact product match section 116 whereby a user can provide feedback to improve the model(s) used in product identification. The nature of the feedback provided can vary in embodiments and can include a binary option indicating the product is correct or not, a numerical score indicating how confident the user is that the product is correctly matched, an option to provide a correct exact product name if known, or other types of feedback as appropriate.

Also shown in exact product match section 116 is a business application section, which can vary in embodiments depending on the use of the product identification application. The business application section can include one or more locations where the product shown can be purchased, whether in a physical store or a link to a website. In some embodiments, multiple locations where the product can be purchased can be displayed together with prices at each location and any other information relevant for comparison between the purchase locations such as shipping speed, quantity available, etc. In some embodiments, the business application can be linked to company or store with which the user of the device is associated. For example, a user of computing device 100 which has an account at www.exampleshoppingsite.com may have exact product match section 116 display products for sale at that site when identifying products, with one or more options for interacting with that website upon identifying a product. In a similar fashion, a website or other retailer could have an association with computing device 100 and preferentially display their business storefront within exact product match section 116 enabling easy access for a user to purchase from the associated website or other retailer. The business application section could also provide information on where a user could sell the product, such as a link to a used goods store or online auction site. The business application section could also allow a user to write a review of the product shown and/or view other users' reviews of the product. These are non-limiting examples of business applications and many more applications can be envisioned by one skilled in the art and used in accordance with the teachings presented herein.

Category product match section 118 can include similar information as exact product match section 116. This can include an image of the product, a name of the category of product, and one or more ways for a user to interact with the category of products shown in category product match section 118. Shown in category product match section 118 is an option to "Browse Category," which can provide a user with products which match the identified category and can lead to information related to where to purchase, sell, review, or read reviews in a similar fashion as discussed above. Browse Category can also include information regarding the category of items.

Figure 2:
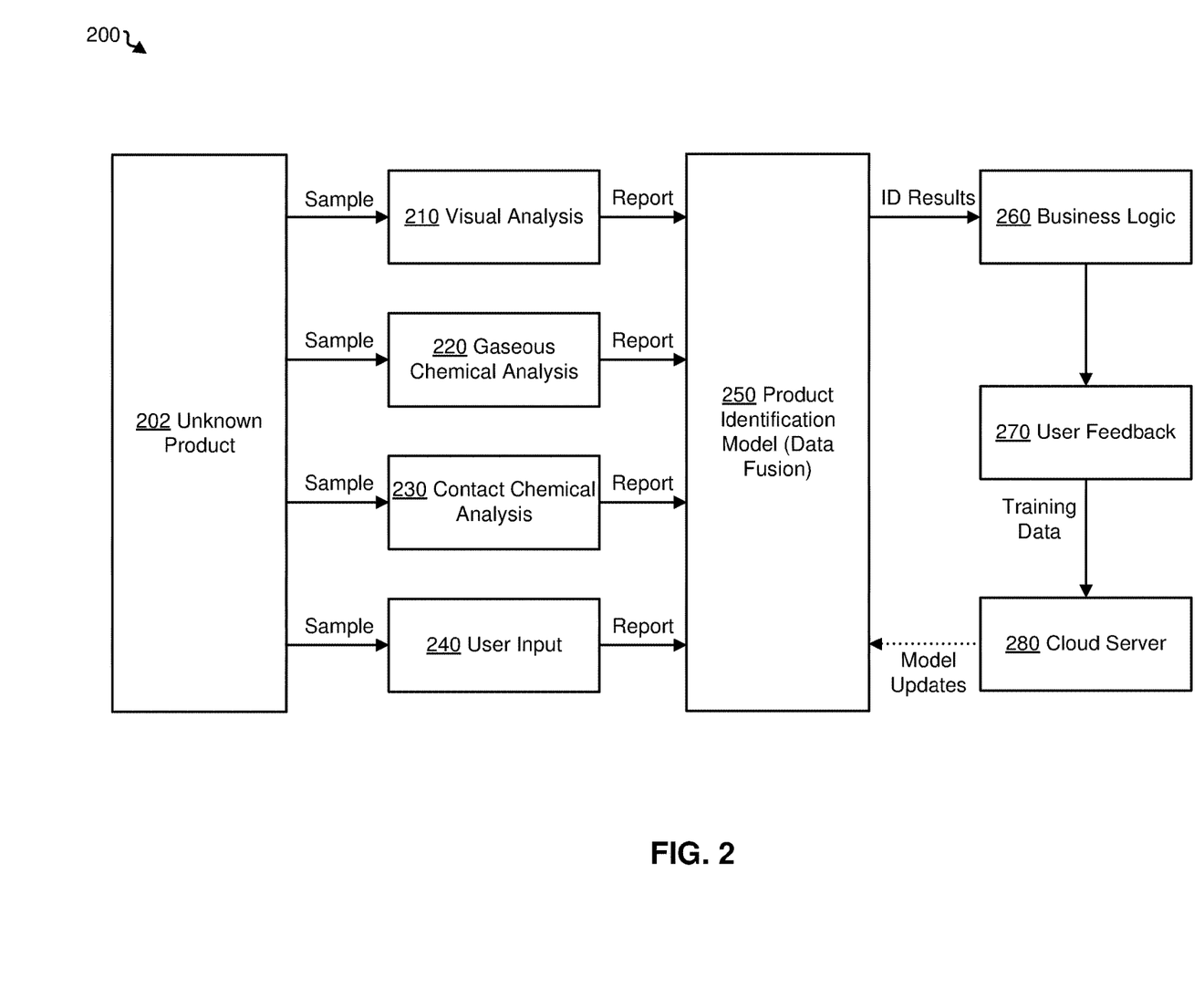
FIG. 2 depicts an example workflow for identifying an unknown product using various types of analyses and a product identification model, in accordance with embodiments of the present disclosure.

Referring now to FIG. 2, depicted is an example workflow 200 for identifying an unknown product using various types of analyses and a product identification model, in accordance with embodiments of the present disclosure. Workflow 200 provides an overview of a method for identifying an unknown product, with a more detailed flowchart describing the operations of the method described below in regard to method 300 of FIG. 3. In some embodiments, workflow 200 can be performed by or performed using a computing device (such as computing device 100 depicted in FIG. 1) and/or by a computer system (such as computer system 400 depicted in FIG. 4).

Workflow 200 includes unknown product 202. Unknown product 202 can be a product of interest (POI) which can be a product that a person or user using workflow 200 is attempting to identify. As depicted by the sample arrows, one or more samples of unknown product 202 can be taken or analyzed for each of visual analysis 210, gaseous chemical analysis 220, contact chemical analysis 230, and/or user input 240. One or more of visual analysis 210, gaseous chemical analysis 220, contact chemical analysis 230, and/or user input 240 can be used to provide report(s) to product identification model (data fusion) 250.

Visual analysis 210 can be triggered by collection of a visual sample of the unknown product 202. This can include a user taking a picture or video of the unknown product 202, such as by using camera 102 of FIG. 1. This can also include a user viewing the unknown product 202 through augmented reality glasses or goggles or otherwise positioning the augmented reality glasses or goggles toward. Once a visual sample is acquired, visual analysis 210 can be performed to analyze the sample to determine if the visual sample can be matched to an exact product, product category, or otherwise aid in identifying the unknown product 202. Visual analysis

210 can include comparing the visual sample with a database or corpus of images, videos, or other visual samples to identify similar images. Visual analysis 210 can include identifying one or more features of unknown product 202 which can be used to distinguish a product from similar products, such as identifying the material of a product, the dimensions of the product or portions of the product, colors of the product, etc. Once visual analysis 210 is complete, the outcome of the analysis can be generated and a report provided. The outcome can include the identification of the unknown product 202 (including an exact match and/or category of product) and can also include a confidence value indicating the relative likelihood the unknown product is the identified product based on the visual analysis 210.

Gaseous chemical analysis 220 can be triggered by collection of a gaseous sample of the unknown product 202. This can include a user using gaseous chemical sensor 104 of FIG. 1, and in some embodiments, sampling probe 106 of FIG. 1. Once a gaseous sample is acquired, gaseous chemical analysis 220 can be performed to analyze the sample to determine if the gaseous chemical sample can be matched to an exact product, product category, or otherwise aid in identifying the unknown product 202. Gaseous chemical analysis 220 can include comparing the gaseous sample with a database or corpus of samples to identify similar gaseous materials.

Gaseous chemical analysis 220 can include identifying one or more chemicals present in the unknown product 202, up to identifying the totality of the chemicals present in the unknown product for a complete gaseous chemical signature. If one or a small number of chemicals present in the unknown product 202 can be identified, this information may be insufficient to identify the unknown product 202 without additional samples such as visual samples analyzed at visual analysis 210, contact chemical samples analyzed at contact chemical analysis 230, and user input analyzed at user input 240; however, this information may be utilized together with these other types of data at product identification model (data fusion) 250 where the information from each of the analyses performed is fused together. On the other hand, if a more complete gaseous chemical signature can be developed, such as by identifying all or most of the chemicals present in the gaseous sample, gaseous chemical analysis 220 may be able to identify the unknown product 202 without additional samples needed. Once gaseous chemical analysis 220 is complete, the outcome of the analysis can be generated and a report can be provided. The outcome can include the identification of one or more chemicals present in the unknown product 202 and/or the identification of the unknown product 202 (including an exact match and/or category of product) and can also include a confidence value indicating the relative likelihood the unknown product is the identified product based on the gaseous chemical analysis 220.

Contact chemical analysis 230 can be triggered by collection of a contact sample of the unknown product 202. This can include a user using contact chemical sensor 108 of FIG. 1, and in some embodiments, sampling probe 106 of FIG. 1. Once a contact sample is acquired, contact chemical analysis 230 can be performed to analyze the sample to determine if the contact chemical sample can be matched to an exact product, product category, or otherwise aid in identifying the unknown product 202. Contact chemical analysis 230 can include comparing the contact chemical sample with a database or corpus of samples to identify similar materials.

Contact chemical analysis 230 can include identifying one or more chemicals present in a product, up to identifying the totality of the chemicals present in the product for a complete chemical signature. If one or a small number of chemicals present in a product can be identified, this information may be insufficient to identify the unknown product 202 without additional samples such as visual samples analyzed at visual analysis 210, gaseous chemical samples analyzed at gaseous chemical analysis 220, and user input analyzed at user input 240; however, this information may be utilized together with these other types of data at product identification model (data fusion) 250 where the information from each of the analyses performed is fused together. On the other hand, if a more complete contact chemical signature can be developed, such as by identifying all or most of the chemicals present in the contact chemical sample, contact chemical analysis 230 may be able to identify the unknown product 202 without additional samples needed. Once contact chemical analysis 230 is complete, the outcome of the analysis can be generated and a report provided. The outcome can include the identification of one or more chemicals present in the unknown product 202 and/or the identification of the unknown product (including an exact match and/or category of product) and can also include a confidence value indicating the relative likelihood the unknown product is the identified product based on the contact chemical analysis 230.

User input 240 can be used in embodiments where at least one of the other types of samples and analyses have been used. A user may provide information about the unknown product 202 directly into the device or system performing workflow 200 describing the unknown product 202. For example, a user smelling a cleaning product may provide user input indicating that the unknown product 202 is believed to be a cleaning product and the workflow may take this information into account in the product identification model (data fusion) 250 by discarding potential product matches which have been categorized as perfumes or odors generated from flowers. In another example, a user may view a dark colored beverage and notice bubbles of carbonation and provide user input that the product is a soda. Using this input, the product identification model (data fusion) 250 can discard potential matches for dark colored soups, coffees, or other non-carbonated liquids.

The product identification model (data fusion) 250 can be a model for combining the input of one or more of the reports from visual analysis 210, gaseous chemical analysis 220, contact chemical analysis 230, and/or user input 240. This product identification model (data fusion) 250 can be an algorithm which fuses together the received reports and can adjust probability weights from one or more of the analyses based on the reports from other analyses. For example, an unknown product 202 may be analyzed with gaseous chemical analysis 220 with a result of a 50% likelihood that a substance A is present in the sample and a 50% likelihood that a substance B is present in the sample. This may result from the two substances (A and B) having similar chemical signatures. The product identification model (data fusion) 250 can factor in the results from visual analysis 210 which identified a color or a viscosity of the unknown product 202 which is consistent with substance A, but not substance B. Thus the report from visual analysis 210 can be used by the data fusion 250 to increase the likelihood that the substance A was present in the unknown product and decrease the likelihood that substance B was present.

Product identification model (data fusion) at 250 can be performed after each report is received from one of the visual analysis 210, gaseous chemical analysis 220, contact chemical analysis 230, and/or user input 240 until a product is matched to unknown product 202. In some embodiments, analyses can be performed until a threshold confidence level is reached, beyond which further analyses are deemed unnecessary. Each time a product cannot be matched to the unknown product 202, or the threshold confidence level is not reached, the user can be instructed to perform additional analyses or provide additional input.

Once a product is identified or all analyses are exhausted, the workflow can continue by sending the identification (ID) results to business logic 260. Business logic 260 can take forms similar to the business application discussed above with regard FIG. 1. The business logic 260 can include an application or directions to one or more locations where the product shown can be purchased, whether in a physical store or by using a link to a website. The business logic 260 can also provide information on where a user could sell the product, such as a link to a used goods store or online auction site. The business logic 260 can also allow a user to write a review of the product shown and/or view other users' reviews of the product. These are non-limiting examples of business logic functions and many more applications can be envisioned by one skilled in the art and used in accordance with the teachings presented herein. In some embodiments, business logic 260 can be optional, such as where a user is attempting to determine the identity of unknown product 202 without any desire to purchase, sell, review, or otherwise deal with the identified product.

At user feedback 270, a user may provide feedback on the reports of any of the analyses performed at 210, 220, or 230, and/or the product identification at 250. The nature of the feedback provided can vary in embodiments and can include a binary option indicating the product is correct or not, a numerical score indicating how confident the user is that the product is correctly matched, an option to provide a correct exact product name if known, or other types of feedback as appropriate. The user feedback 270 can be used for training data which can be sent to a cloud server 280 or other repository of information. This data can be used to improve the identification of the system and achieve a crowd sourced product identification model training.

Cloud server 280 or other repository of information can be a corpus of information which stores the results of the analyses, product identifications, and user feedback for future identifications of unknown products 202. As the information stored within cloud server 280 grows, future identifications can become more and more accurate by comparing unknown products 202 with greater amounts of reference data. Cloud server 280 can provide model updates to the product identification model (data fusion) 250, and as appropriate to the visual analysis 210, gaseous chemical analysis 220, and contact chemical analysis 230 using the data stored within cloud server 280.

Figure 3:
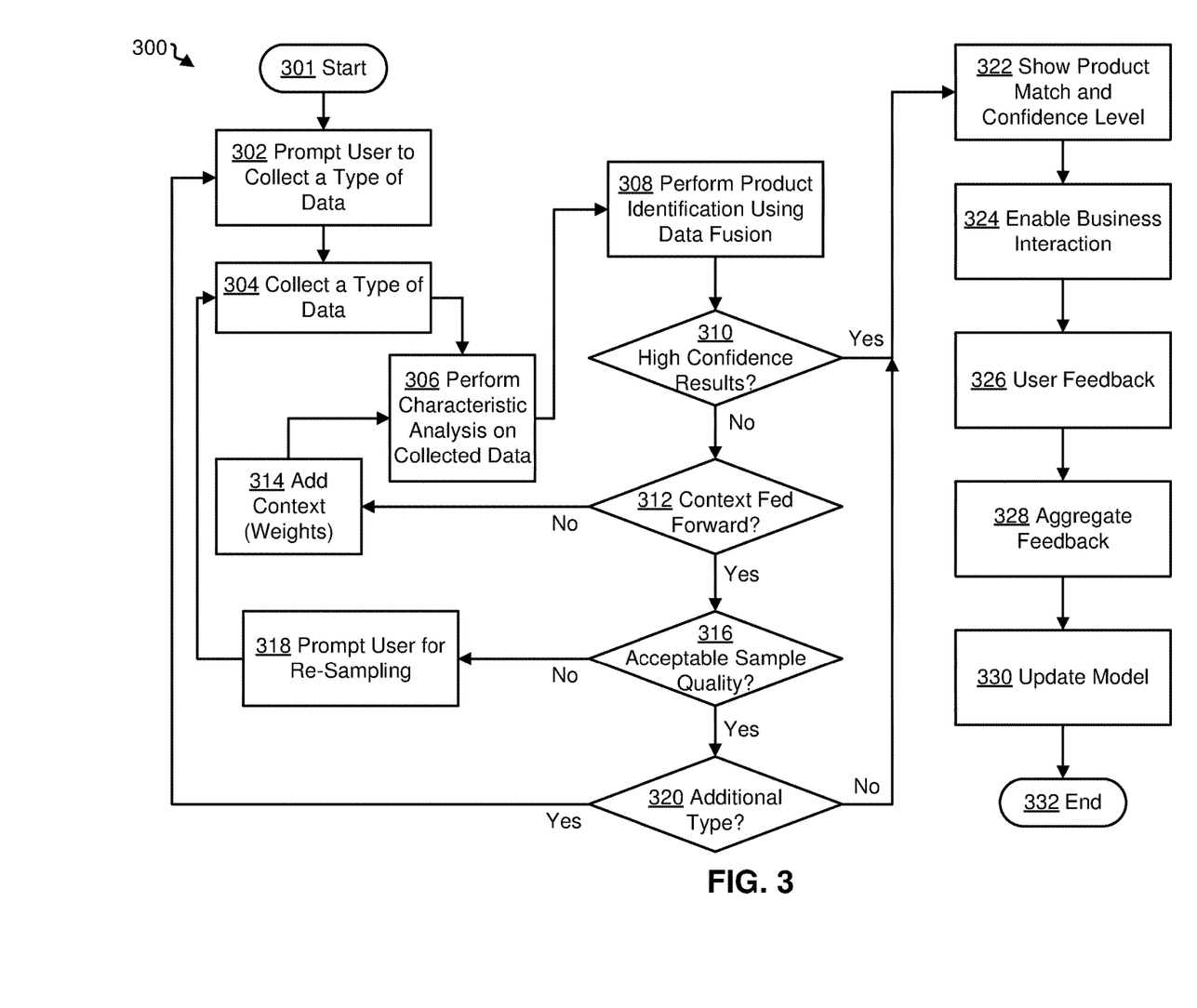
FIG. 3 depicts an example method for product identification, in accordance with embodiments of the present disclosure.

Referring now to FIG. 3, depicted is an example method 300 for product identification, in accordance with embodiments of the present disclosure. Method 300 can include more or fewer operations than those depicted. Method 300 can include operations in different orders than those depicted. In some embodiments, method 300 can be used to perform workflow 200 in identifying an unknown product described above in regard to FIG. 2. In some embodiments, method 300 can be performed by or performed using a computing device (such as computing device 100 depicted in FIG. 1) and/or by a computer system (such as computer system 400 depicted in FIG. 4).

Method 300 begins at start 301. Start 301 may be initiated when a user presses a button on a device to activate product identification (such as button 112 of computing device 100 shown in FIG. 1.) or when a user opens a product identification application.

After start 301, method 300 proceeds to 302 to prompt user to collect a type of data. In some embodiments, the prompt at 302 can allow a user to select a type of data to collect, including, for example, visual data, gaseous chemical data, contact chemical data, or user input data. In other embodiments, operation 302 can prompt a user to collect a specific type of data. This may especially be true on a second or later time operation 302 is reached in performance of method 300 (for example, once a user has collected contact chemical data, the method 300 may request visual data be collected). In some embodiments, a user may be able to input a preferred order of data collection and when performing operation 302, the types of data to be collected can be prompted in the preferred order. In other embodiments, the user may simply be prompted to collect data and the system used to perform method 300 can analyze whatever data is collected in future operations.

At 304, the user performing method 300 collects the type of data prompted or selected to be collected at 302. This can involve sample collection such as discussed above with regard to visual analysis 210, gaseous chemical analysis 220, contact chemical analysis 230, or user input 240 of FIG. 2 and can occur using one or more sensors or probes of computing device 100 of FIG. 1 as appropriate.

At 306, method 300 performs characteristic analysis on the collected data. This analysis can be one of visual analysis 210, gaseous chemical analysis 220, contact chemical analysis 230, or user input 240 of FIG. 2 as discussed in more detail above. The outcome of operation 306 can be a report such as discussed above.

At 308, method 300 performs product identification using data fusion. Operation 308 can be substantially similar to the algorithm used by product identification model (data fusion) 250 of FIG. 2. Method 300 can use the data collected at 304 and the characteristic analysis performed at 306 from all of the types of data analyzed in the performance of method 300 up to this point. For example, the second time operation 308 is reached, both of the types of data collected at operation 304 and characteristic analyses performed at operation 306 can be considered together. In this way, the data can be fused together to improve the likelihood of a product match and increase confidence levels in the results. The output of operation 308 can be product identification results and a confidence level indicating the likelihood that a product being identified is the product identified by operation 308.

At 310, method 300 checks whether the data fusion has resulted in high confidence results. In some embodiments, a user may be able to set a threshold value for what level of confidence results are considered "high." For example, a user more interested in quick results can select a threshold of 50% likelihood of a match as high confidence, whereas a user more concerned with accuracy could select a threshold of 90%. If at 310, the results are above the threshold of high confidence, method 300 proceeds to operation 322. If at 310, the results are not above the threshold, the method proceeds to operation 312.

At operation 312, method 300 checks whether context data has been fed forward. Context data can be data from one or more previous iterations of operation 304 where the collected data can provide context for future analyses of the same product to be identified. Using the example from above of substances A and B in a product to be identified, whichever sampling and analysis was performed first (the testing which showed a 50% likelihood of substance A and 50% likelihood of substance B or the visual testing which indicated a color and/or viscosity) would be context data for the subsequent analysis after the second sample. As such, in the event operation 312 is reached a first time, there will be no context data to have been fed forward in the analysis. However, when operation 312 is reached a second or later time in method 300, method 300 can determine whether any context data from previous sampling was fed forward to the other analysis models (e.g., determine where context data from visual sampling and analysis was fed forward to the gaseous chemical analysis model). If such context data was not fed forward, method 300 proceeds to operation 314.

In some embodiments, operation 312 may be optional and instead context data is always fed forward to other types of analyses yet to be performed. This can avoid checking whether context data has been fed forward and the potential for re-analyzing data after context data has been fed forward. However, feeding context data forward to other analyses may not be necessary or appropriate for some circumstances and feeding context data forward may waste computing data and resources. In further embodiments, operation 312 may be accompanied by a determination of whether feeding context data forward will yield an improvement in the characteristic analysis. Continuing with the example using substances A and B, if there are no visual differences between these substances, a determination may be made that feeding this context data forward to the visual analysis is unnecessary.

If the result at 312 is no, context data was not fed forward, method 300 reaches operation 314 and adds context data, including if appropriate, weights to the data. This will vary in embodiments depending on the context data being fed forward. In an example where a user has provided user input regarding observations of a product or suspicions of what a product may be, this could be increasing weights to product categories which match those observations. In an example where visual analysis has been performed and one or more physical properties have been determined, the context data could be assigning a 0 weight to any products or product categories which do not have these physical properties. Upon completion of operation 314, method 300 returns to operation 306 where characteristic analysis is performed on the collected data with this context data included in the analysis.

If the result at 312 is yes, context data was fed forward, method 300 reaches operation 316 and determines whether the sample collected is of acceptable sample quality. This can include determining things such as if a picture or video was in focus, properly zoomed in, and adequately lit, if a sample probe used for gaseous or contact chemical analysis was removed from the interior of a device to appropriately sample the product, whether the sample probe contains the same chemicals as a previous performance of method 300 indicating it has not been cleaned, or any other indication that the sample collected is unacceptable. If the result at 316 is that the sample was not of acceptable quality, method 300 proceeds to operation 318 and prompts the user for re-sampling. After the prompt at 318, method 300 returns to operation 304 where the user can collect the data again.

If the result at 316 is yes, the sample was of acceptable quality, method 300 proceeds to operation 320 where it is determined if there is an additional type of sample collection and analysis that can be performed. Discussed herein have been visual analysis, gaseous chemical analysis, contact chemical analysis, and user input, and if one or more of these remain unperformed, the determination at 320 can be yes and the method 300 can return to operation 302 and prompt the user to collect an additional type of data. In some embodiments, additional types of analysis can be included and if as yet un-performed, also yield a result of yes. If no additional types of analysis remain, method 300 proceeds to operation 322.

In this way, operation 322 is reached once either high confidence results are reached at 310, which can be after any number of types of samples and analyses have been performed, or upon the completion of all types of samples and analyses have been performed and a high confidence result has still not yet been reached. Accordingly, a user may be able to save the time and trouble of performing one or more types of sample collection and analysis if a high confidence level is reached before they are performed, but also can receive a result even if all types of analyses are performed and still do not yield a highly confident result.

In either case, at operation 322 method 300 shows a product match and confidence level. This product match can be an exact product match if appropriate based upon the analyses and confidence level and/or a category of products, which can occur if there is insufficient data to determine an exact match or a low confidence of an exact match.

At operation 324, method 300 enables business interaction. The nature of enabling business interaction 324 can vary in embodiments. In some embodiments, a business application such as that shown on display 110 of FIG. 1 and discussed above can be run. A user may be shown one or more locations where the product match can be purchased, prices of the product, more detailed information of the product (which can take the form of e.g., a link to a manufacturer's or seller's description of the product), other users' reviews of the product, etc. In some embodiments, other users' reviews of the product can include the accuracy of product detection, enabling a user the ability to gain insight into the accuracy of the machine product identification for the particular product identified, which can influence purchasing decisions. In some embodiments, enabling business interaction can involve providing a user an option to add the product to a shopping cart or to a checkout window where the user can opt to purchase the product directly. In some embodiments, if the product is out of stock, alternative vendors can be displayed or linked, and in some embodiments comparable products which are in stock can be displayed as substitutes for the identified product. In some embodiments, if a product is out of stock, a user can be given an option to be notified when the product is in stock again at a future time. In some embodiments, a user may be able to browse through or select comparable or similar products regardless of whether the matching product is in stock.

At operation 326, a user provides feedback. This operation can be substantially similar to block 270 of FIG. 2 as discussed above.

At operation 328, user feedback can be aggregated, including the newly received feedback at operation 326 and user feedback received in previous performances of method 300. This can occur at a cloud server such as described above with regard to block 280 of FIG. 2. Based upon the aggregated feedback, method 300 can update one or more models at 330. This can include updating models used for individual types of data used at 306 (e.g., updating the visual analysis model based upon the aggregated feedback) or the data fusion model used at 308. In some embodiments operation 330 may not be performed such as if a user provides inadequate or contradictory feedback which does not affect the aggregated feedback in a way which leads to an update in one or more models. Once operation 330 is complete, method 300 ends at 332.

Figure 4:
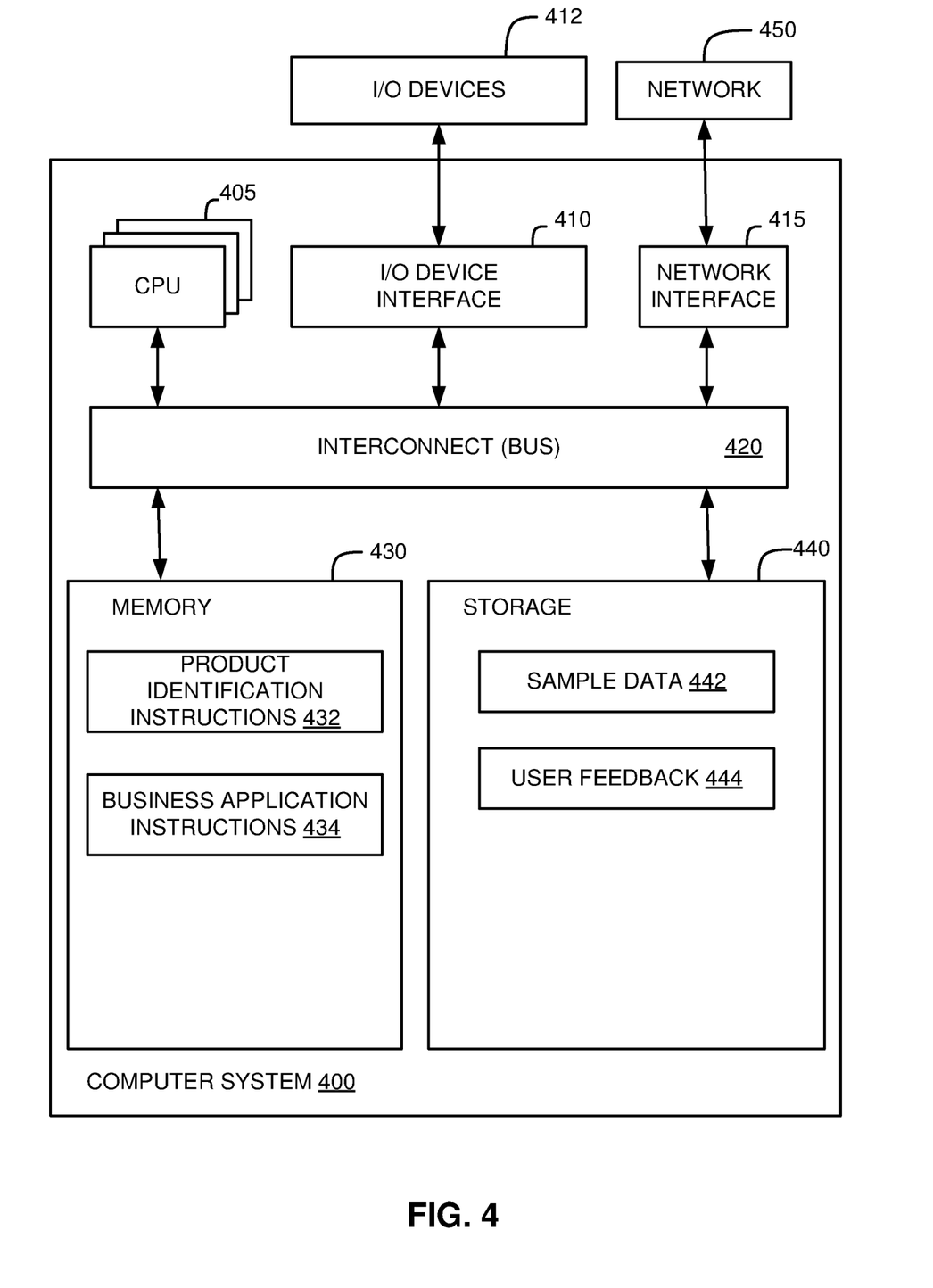
FIG. 4 illustrates a block diagram of a computer system, in accordance with some embodiments of the present disclosure.

Referring now to FIG. 4, illustrated is a block diagram of a computer system 400, in accordance with some embodiments of the present disclosure. In some embodiments, computer system 400 performs operations in accordance with workflow 200 of FIG. 2 and/or method 300 of FIG. 3 as described above. In some embodiments, computer system 400 can be consistent with computing device 100 of FIG. 1 or a component thereof. The computer system 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash).

In some embodiments, the memory 430 can be in the form of modules (e.g., dual in-line memory modules). The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the computer system 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of computer system 400 includes product identification instructions 432 and business application instructions 434. Product identification instructions 432 can be an application or compilation of computer instructions for identifying products using computer system 400. Product identification instructions can be comprised of instructions for performing each type of analysis employed by the computer system 400 including visual analysis, gaseous chemical analysis, contact chemical analysis, and utilization of user input. Product identification instructions 432 can also be comprised of instructions for data fusion involving combining the results of multiple types of analyses to identify a product.

Business application instructions 434 can be computer instructions for enabling a user of computer system 400 to purchase, sell, review, or otherwise interact with a business function regarding an identified product or category of products identified by product identification instructions 432.

Storage 440 contains sample data 442 and user feedback 444. Sample data 442 can be data in any format which relates to the samples acquired by the computer system 400. In some embodiments, sample data 442 will be data collected by the computer system 400 in performance of workflow 200 of FIG. 2 and/or method 300 of FIG. 3. In other embodiments, sample data 442 can be a repository of sample data in a corpus of information for comparing newly received sample data to, in order to aid in product identification. In some embodiments, this corpus of information may be stored in an external storage source, such as network storage or on a remote computer.

User feedback 444 can be various types of user feedback. In some embodiments, user feedback 444 can be data collected by the computer system 400 in performance of workflow 200 of FIG. 2 and/or method 300 of FIG. 3. In other embodiments, user feedback 444 can be a repository of aggregated user feedback in a corpus of information for use in updating the models used by product identification instructions 432. In some embodiments, this corpus of information may be stored in an external storage source, such as network storage or on a remote computer.

In some embodiments as discussed above, the memory 430 stores product identification instructions 432 and business application instructions 434, and the storage 440 stores sample data 442 and user feedback 444. However, in various embodiments, each of the product identification instructions 432, business application instructions 434, sample data 442, and user feedback 444 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from a user and present information to a user and/or a device interacting with computer system 400. In some embodiments, I/O devices 412 include one or more of camera 102, gaseous chemical sensor 104, sampling probe 106, and contact chemical sensor 108 of FIG. 1.

The network 450 can connect (via a physical or wireless connection) the computer system 400 with other networks, and/or one or more devices that interact with the computer system.

Logic modules throughout the computer system 400— including but not limited to the memory 430, the CPUs 405, and the I/O device interface 410—can communicate failures and changes to one or more components to a hypervisor or operating system (not depicted). The hypervisor or the operating system can allocate the various resources available in the computer system 400 and track the location of data in memory 430 and of processes assigned to various CPUs 405. In embodiments that combine or rearrange elements, aspects and capabilities of the logic modules can be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A computer-implemented method for product identification, the method comprising:
   collecting a first type of data regarding an unidentified product through a first sensor selected from the group consisting of a visual spectrum camera, a gaseous chemical sensor, and a contact chemical sensor;
   performing a first type of analysis on the first type of data;
   collecting a second type of data regarding the unidentified product through a second sensor selected from the group consisting of the visual spectrum camera, the gaseous chemical sensor, and the contact chemical sensor, wherein the second sensor is different from the first sensor;
   performing a second type of analysis on the second type of data;
   based upon the first type of analysis on the first type of data and the second type of analysis on the second type of data, performing product identification for the unidentified product comprising:
      feed forwarding context data from one or more previous analyses of one of the first type of analysis and the second type of analysis to a subsequent performing of the second type of analysis and a subsequent performing of the first type of analysis, respectively; and
      outputting, based on the product identification, an identity of the unidentified product; and
   enabling a user to perform a business interaction with a product matching the identity of the unidentified product comprising:
      providing the user one or more locations where the product matching the identity of the unidentified product can be sold by the user.

2. The method of claim 1, wherein enabling the user to perform the business interaction with the product matching the identity of the unidentified product further comprises providing the user one or more locations where the product matching the identity of the unidentified product is available for purchase.

3. The method of claim 2, wherein enabling the user to perform the business interaction further comprises:
   enabling the user to add the product matching the identity of the unidentified product to a shopping cart; and
   allowing the user to purchase the product matching the identity of the unidentified product.

4. The method of claim 2, wherein enabling the user to perform the business interaction comprises allowing the user to read one or more reviews of the product matching the identity of the unidentified product.

5. The method of claim 4, wherein a review of the one or more reviews of the product matching the identity of the unidentified product includes information regarding an accuracy of product identification for the product matching the identity of the unidentified product.

6. The method of claim 2, wherein enabling the user to perform the business interaction comprises allowing the user to view one or more comparable products to the product matching the identity of the unidentified product.

7. A system for product identification, the system comprising:
   one or more processors;
   one or more sensors selected from the group consisting of a visual spectrum camera, a gaseous chemical sensor, and a contact chemical sensor; and
   a memory communicatively coupled to the one or more processors,
   wherein the memory comprises instructions which, when executed by the one or more processors, cause the one or more processors to perform a method comprising:
      collecting a first type of data regarding an unidentified product through a first sensor of the one or more sensors;
      performing a first type of analysis on the first type of data;
      collecting a second type of data regarding the unidentified product through a second sensor of the one or more sensors, wherein the second sensor is different from the first sensor;
      performing a second type of analysis on the second type of data;
      based upon the first type of analysis on the first type of data and the second type of analysis on the second type of data, performing product identification for the unidentified product comprising:
         feed forwarding context data from one or more previous analyses of one of the first type of analysis and the second type of analysis to a subsequent performing of the second type of analysis and a subsequent performing of the first type of analysis, respectively; and
         outputting, based on the product identification, an identity of the unidentified product; and
      enabling a user to perform a business interaction with a product matching the identity of the unidentified product comprising:
         providing the user one or more locations where the product matching the identity of the unidentified product can be sold by the user.

8. The system of claim 7, wherein enabling the user to perform the business interaction with the product matching the identity of the unidentified product further comprises providing the user one or more locations where the product matching the identity of the unidentified product is available for purchase.

9. The system of claim 8, wherein enabling the user to perform the business interaction further comprises:
   enabling the user to add the product matching the identity of the unidentified product to a shopping cart; and
   allowing the user to purchase the product matching the identity of the unidentified product.

10. The system of claim 8, wherein enabling the user to perform the business interaction comprises allowing the user to read one or more reviews of the product matching the identity of the unidentified product.

11. The system of claim 10, wherein a review of the one or more reviews of the product matching the identity of the unidentified product includes information regarding an accuracy of product identification for the product matching the identity of the unidentified product.

12. The system of claim 8, wherein enabling the user to perform the business interaction comprises allowing the user to view one or more comparable products to the product matching the identity of the unidentified product.

13. A computer program product for product identification, the computer program product comprising a computer readable storage medium having program instructions embodied therewith, wherein the computer readable storage medium is not a transitory signal per se, the program instructions executable by a computer to perform a method comprising:
   collecting a first type of data regarding an unidentified product through a first sensor selected from the group consisting of a visual spectrum camera, a gaseous chemical sensor, and a contact chemical sensor;
   performing a first type of analysis on the first type of data;
   collecting a second type of data regarding the unidentified product through a second sensor selected from the group consisting of the visual spectrum camera, the gaseous chemical sensor, and the contact chemical sensor, wherein the second sensor is different from the first sensor;
   performing a second type of analysis on the second type of data;
   based upon the first type of analysis on the first type of data and the second type of analysis on the second type of data, performing product identification for the unidentified product comprising:
      feed forwarding context data from one or more previous analyses of one of the first type of analysis and the second type of analysis to a subsequent performing of the second type of analysis and a subsequent performing of the first type of analysis, respectively; and
      outputting, based on the product identification, an identity of the unidentified product; and
   enabling a user to perform a business interaction with a product matching the identity of the unidentified product comprising
      providing the user one or more locations where the product matching the identity of the unidentified product can be sold by the user.

14. The computer program product of claim 13, wherein enabling a user to perform a business interaction with a product matching the identity of the unidentified product further comprising one or more of:
   providing the user one or more locations where the product matching the identity of the unidentified product is available for purchase;
   enabling the user to add the product matching the identity of the unidentified product to a shopping cart;
   allowing the user to purchase the product matching the identity of the unidentified product; and
   allowing the user to read one or more reviews of the product matching the identity of the unidentified product, wherein the product matching the identity of the unidentified product includes information regarding an accuracy of product identification for the product matching the identity of the unidentified product.

\* \* \* \* \*